United States Patent
Shareef et al.

(10) Patent No.: US 7,822,570 B2
(45) Date of Patent: Oct. 26, 2010

(54) METHODS FOR PERFORMING ACTUAL FLOW VERIFICATION

(75) Inventors: Iqbal A. Shareef, Fremont, CA (US); James V. Tietz, Fremont, CA (US); Vernon Wong, Mountain View, CA (US); Richard J. Meinecke, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 188 days.

(21) Appl. No.: 11/938,171

(22) Filed: Nov. 9, 2007

(65) Prior Publication Data

US 2008/0115560 A1    May 22, 2008

Related U.S. Application Data

(60) Provisional application No. 60/866,406, filed on Nov. 17, 2006.

(51) Int. Cl.
    *G01F 1/12* (2006.01)
(52) U.S. Cl. .............................. 702/100; 73/1.34
(58) Field of Classification Search ............. 702/33, 702/45, 47, 50, 85, 98, 100, 104–105, 138, 702/140; 73/1.36, 1.34; 156/345.33–345.34
    See application file for complete search history.

(56) References Cited

U.S. PATENT DOCUMENTS

| | | | |
|---|---|---|---|
| 4,437,489 A | | 3/1984 | Casale |
| 4,794,947 A | | 1/1989 | Kuramochi |
| 5,207,089 A | | 5/1993 | Abt et al. |
| 5,445,035 A | * | 8/1995 | Delajoud ............. 73/861.52 |
| 5,968,588 A | * | 10/1999 | Sivaramakrishnan et al. ... 427/8 |
| 6,062,256 A | | 5/2000 | Miller et al. |
| 6,074,691 A | | 6/2000 | Schmitt et al. |

(Continued)

FOREIGN PATENT DOCUMENTS

KR    1020010090666 A    10/2001

(Continued)

OTHER PUBLICATIONS

US Appl. No. 11/938,168, filed Nov. 9, 2007; Inventors: Iqbal, et al.

(Continued)

*Primary Examiner*—Hal D Wachsman
*Assistant Examiner*—Mary C O'Malley
(74) *Attorney, Agent, or Firm*—IP Strategy Group, P.C.

(57) ABSTRACT

A method for determining an actual gas flow rate in a reaction chamber of a plasma processing system is provided. The method includes delivering gas by a gas flow delivery system controlled by a mass flow controller (MFC) to an orifice, which is located upstream from the reaction chamber. The method also includes pressurizing the gas to create a choked flow condition within the orifice. The method further includes measuring a set of upstream pressure values of the gas via a set of pressure sensors. The method yet also includes applying a calibration factor of a set of calibration factors to determine the actual flow rate. The calibration factor is a ratio of an average of the set of upstream pressure values to an average of a set of golden upstream pressure values, which is associated with an indicated flow rate for an MFC.

19 Claims, 4 Drawing Sheets

U.S. PATENT DOCUMENTS

| | | |
|---|---|---|
| 6,523,346 B1 * | 2/2003 | Hoffmann et al. ............. 60/646 |
| 6,591,850 B2 | 7/2003 | Rocha-Alvarez et al. |
| 6,619,139 B2 | 9/2003 | Popp |
| 7,169,231 B2 | 1/2007 | Larson et al. |
| 7,335,396 B2 | 2/2008 | Carpenter et al. |
| 2004/0056368 A1 | 3/2004 | Hirahara et al. |
| 2004/0173091 A1 | 9/2004 | Belke et al. |
| 2007/0021935 A1 * | 1/2007 | Larson et al. ............... 702/100 |

FOREIGN PATENT DOCUMENTS

| | | |
|---|---|---|
| WO | WO 00/15870 A1 | 3/2000 |
| WO | WO-2007/008509 A2 | 1/2007 |

OTHER PUBLICATIONS

US Appl. No. 11/083,761, filed Mar. 16, 2005; Inventors: Wong et al.
"Written Opinion", Issue in PCT Application No. PCT/US2007/084724; Mailing Date.: Apr. 21, 2008.
"International Search Report", Issue in PCT Application No. PCT/US2007/084724; Mailing Date.: Apr. 21, 2008.
"International Preliminary Report on Patentability", Issued in PCT Application No. PCT/US2007/084724; Mailing Date: May 28, 2009.
"Australian Patent Office Examination Report", Issued in Singapore Application No. SG 200903325-9; Mailing Date: Jan. 21, 2010.
"Non Final Office Action", U.S. Appl. No. 11/938,168, Mailing Date: May 28, 2010.
"Non Final Office Action", U.S. Appl. No. 11/938,168, Mailing Date: Feb. 18, 2010.

* cited by examiner

METHODS FOR PERFORMING ACTUAL FLOW VERIFICATION

PRIORITY CLAIM

This application is related to and claims priority under 35 U.S.C §119(e) to a commonly assigned provisional patent application entitled "Methods For Performing Actual Flow Verification;" by Shareef et al., Application Ser. No. 60/866,406 filed on Nov. 17, 2006, all of which is incorporated herein by reference.

CROSS REFERENCE TO RELATED APPLICATIONS

The present invention is related to the following applications, all of which are incorporated herein by reference:

Commonly assigned application entitled "Methods For Performing Transient Flow Prediction and Verification Using Discharge Coefficient;" by Shareef et al., Application Ser. No. 60/866,404 filed on Nov. 17, 2006, all of which are incorporated herein by reference:

Commonly assigned application entitled "Gas Distribution System with Tuning Gas/" filed on Dec. 31, 2002 by Larson et al., application Ser. No. 10/318,612; and Commonly assigned application entitled "System and Method for Gas Flow Verification," filed on Mar. 16, 2005 by Wong et al., application Ser. No. 11/083,761.

BACKGROUND OF THE INVENTION

Advances in plasma processing have facilitated growth in the semiconductor industry. During plasma processing, a semiconductor manufacturer may employ a recipe to etch and/or deposit material on a substrate. The recipe may include a plurality of parameters including, for example, the level of RF power, the gas, the temperature, the pressure, the gas flow rate, and the likes. Each of the parameters of the recipe works together to produce a quality device (e.g., MEMs, etc.). Thus, inaccurate parameters may result in substandard device and/or defective device.

To minimize inaccuracy, the various components that provide the parameters may have to be monitored and/or verified. The flow rate of gas is one such parameter that may have to be verified. During substrate processing, the amount of process gas furnished to the reaction chamber is generally carefully controlled. The indicated gas flow rate (i.e., process gas flow rate) is commonly controlled by a mass flow controller (MFC). Consider the situation wherein, for example a critical process step requires allow rate of 40 standard cubic centimeters (sccm). A process engineer may enter the flow rate in the process recipe and apply the recipe into the plasma tool from a user interface. In entering the recipe flow rate, the process engineer is assuming that the mass flow controller (MFC) will be flowing gas into the reaction chamber at the desired rate. However, the actual flow rate of the gas may vary from the indicated flow rate of the MFC. As discussed herein, an indicated flow rate refers to the flow rate that is shown as the MFC flow rate that is displayed on the plasma tool's user interface.

The accuracy of the indicated flow rate may be dependent upon the accuracy of the MFC. During the manufacture of the MFC, one or more verification test may be performed on the MFC to validate that the gas flow rate control provided by the MFC is within established MFC design specification tolerances. The MFC verification is usually performed in a controlled laboratory environment using an inert gas such as $N_2$ gas. To translate the verification results into corresponding results for other gases (which may be employed in actual production environment), conversion factors may be applied. However, the translated corresponding results may have errors since the conversion factors have an inherent level of uncertainty.

Over time, the MFC performance may degrade resulting in a flow rate inaccuracy. In other words, the indicated flow rate of the MFC and may be outside of the design specification tolerance for the MFC due to calibration drift, zero drift, or gas-calibration error and the MFC may have to be recalibrated or replaced.

A flow verification method is required to determine the percentage of error of the MFC flow rate so that a flow correction can be made to correct the inaccuracy in the gas delivery system. One method that has been employed to validate the indicated flow rate of the MFC is the rate of rise (ROR) procedure. With the ROR procedure, a reaction chamber volume is filled and the pressure rate of rise of the gas is measured. With the ROR method, an actual flow rate for the gas may be determined.

The ROR procedure is a lengthy process which may take about 10 or more hours. The long length time period may be due to the large reaction chamber volume (e.g., up to 60 liters. Other factors include a plurality of gas lines and a plurality of gas boxes in the plasma tool and elevated operating temperatures of certain reaction chambers In addition to the ROR procedure being a lengthy process, the ROR procedure may also suffered from inaccuracy in matching process results from chamber to chamber. In an example, the volume may vary between chambers of the same size due to manufacturing tolerance of chamber components. In an example, large temperature difference in the chamber may result in a change in volume. Thus, the ROR procedure is a cumbersome method that may introduce longer time duration due to elevated reaction chamber operation temperature.

Also, the ROR procedure may require the plasma tool to be cooled down before the ROR procedure may be performed. The cooling down period may be about 2 or more hours, which represents additional time the reaction chamber is not available for processing wafers. As a result, the ROR procedure may contribute to cost of ownership without really providing a true method for validating the indicated flow rate of the MFC.

Another method that may be employed to verify the indicated flow rate of the MFC includes utilizing a small external ROR chamber or a flow measurement standard (e.g., Molbloc) instead of the actual reaction chamber. With the external flow measurement device method, the external device may be employed as a testing device which may be directly connected lo the MFC to test the flow rate of a gas. Thus, the external device may be employed as a flow verification device.

By employing the external device, a plurality of pressure sensing manometers may be required to accurately measure pressure measurements covering the flow rate of semiconductor manufacturing equipment from 1 sccm to 10,000 sccm. To minimize the time duration of each pressure measurement, a plurality of chamber volumes may have to be designed into the small chamber ROR device. In addition, by employing the smaller chamber ROR device, the time period for filling up the chamber is reduced and the temperature impact on the chamber may also be minimized. However, only inert gases may be tested in the smaller chamber. Thus, real gases that may be employed in etching (e.g., etchant gases) are not tested. As a result, the eternal How measurement device method is unable to test for the effect on flow rate due lo the compressibility of the gases In addition, the smaller chamber ROR device usually requires the utilization of a separate proprietary computer system, thereby not providing an integrated solution with the plasma processing system.

BRIEF DESCRIPTION OF THE DRAWINGS

The present invention is illustrated by way of example, and not by way of limitation, in the figures of the accompanying drawings and in which like reference numerals refer to similar elements and in which.

BRIEF SUMMARY OF THE INVENTION

Figure 1:
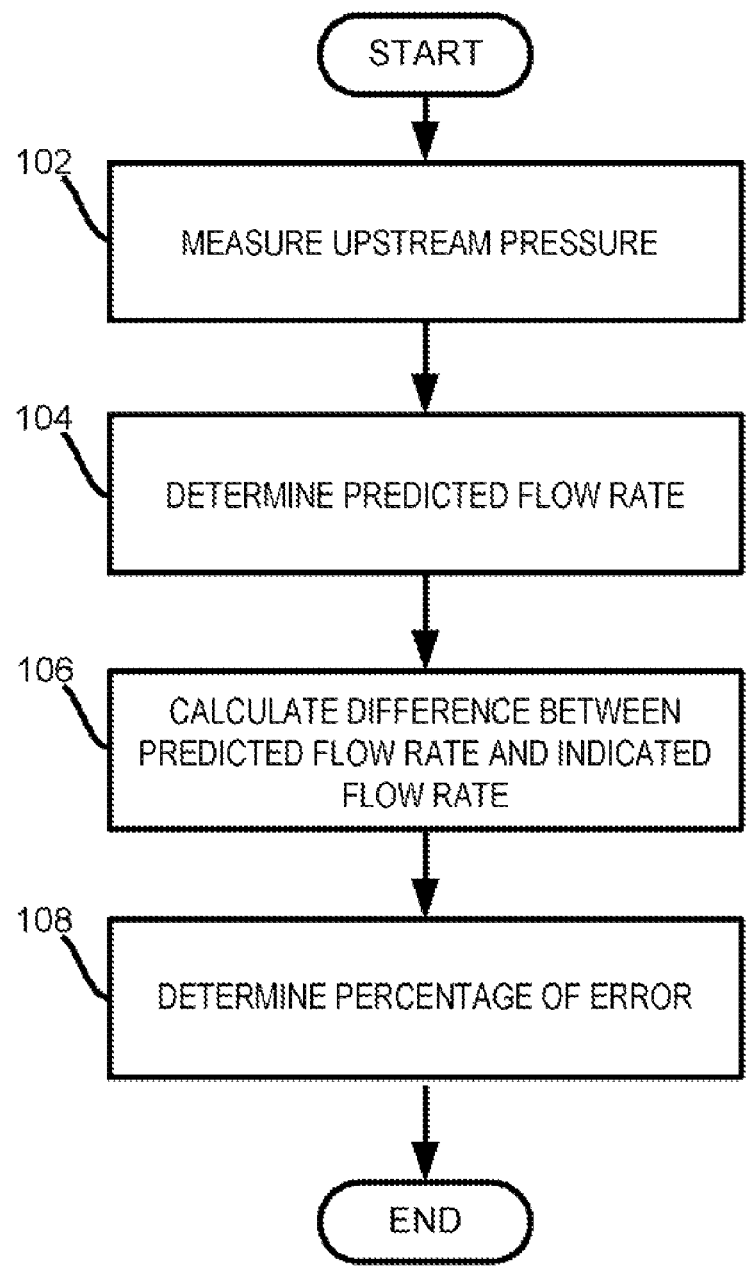
FIG. 1 shows, in an embodiment of the invention, a precision orifice method for determining the percentage of error.

The invention relates, in an embodiment, to a method for determining an actual gas flow rate in a reaction chamber of a plasma processing system. The method includes delivering gas by a gas flow delivery system controlled by a mass flow controller (MFC) to an orifice, which is located upstream from the reaction chamber. The method also includes pressurizing the gas to create a choked flow condition within the orifice. The method further includes measuring a set of upstream pressure values of the gas via a set of pressure sensors. The method yet also includes applying a calibration factor of a set of calibration factors to determine the actual flow rate. The calibration factor is a ratio of an average of the set of upstream pressure values to an average of a set of golden upstream pressure values, which represents pressure values associated with an indicated flow rate, which is a flow rate as indicated by the MFC.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. Tire computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed arid may include a combination of a computer/computing device and dedicated/programmable circuits adapted for the various operations pertaining to embodiments of the invention.

In accordance with one aspect of the present invention, the inventors herein realized that when an orifice is in a choked flow condition, in which the gas exiling the orifice is flowing at sonic velocity, the actual flow rate of the gas may be determined from the upstream pressure (i.e., the pressure at the input channel of the orifice). Thus, the inventors herein realized that a more accurate and less time consuming process may be implemented by determining actual flow rate, which in turn enable the calculation of percentage of error, in an orifice instead of measuring flow rate in a process chamber (e.g., ROR procedure) and/or a flow measurement standard (e.g., Molbloc).

In accordance with embodiments of the present invention, a precision orifice method is provided for validating an actual flow rate of a gas delivered by a gas delivery system having a mass flow controller into a reaction chamber. In an embodiment, the precision orifice method includes measuring an upstream pressure of an orifice under choked flow condition and calculating the error between the indicated flow rate and the predicted flow rate. In an embodiment, a linear relationship, or slope of the line may exist between an upstream pressure and a flow rate. The predicted flow rate (i.e., actual flow rate) may be mathematically calculated based on an assumption that flow rate is equal to the upstream pressure multiplied by the slope of the line, plus a constant.

In another embodiment, the predicted flow rate associated with the measured flow-rate may be extracted from an accurate gas table. As discussed herein, an accurate gas table refers to a table of pressure versus flow rate based on real gas properties and an accurate MFC (an MFC that is accurate, stable and repeatable) and a precision orifice (an orifice that is assumed to be of a known diameter and without blemish). See Gas Table section for a discussion on how the accurate gas table is established.

In an embodiment, the percent of error may be calculated by first finding the difference between the predicted and indicated flow rates. Next, the difference between the two flow rates may be divided by the indicated flow rate of the MFC, With the percentage of error, the process engineer may now be able to adjust the indicated flow rate to correct for the error.

In accordance with embodiments of the present invention, a calibrated orifice method is provided to derive a calibration factor that may be used as a correction to the measured upstream pressure and resulting in a predicted flow rate. Unlike the precision orifice method, the calibrated orifice method accounts for the diametric and geometric difference that may exist; in each orifice.

In an embodiment, the calibration factor may be calculated by measuring a set of upstream pressure values within a given orifice, which is in a choked flow condition, for a given indicated flow rate. The set of measured upstream pressure values may be aggregated and averaged to determine the average pressure value for the given orifice. To calculate the calibration factor, the average pressure value for the given orifice may be divided by an average of a set of pressure values from the accurate gas table that is associated with the indicated flow rate.

With the calibration factor, a correction is applied to the measured upstream pressure so that a predicted flow rate may be obtained from the gas table. In an embodiment, the calibration factor may be pre-determined for each orifice before the orifice is installed in the reaction chamber. With the calibration factor, a percentage of error may be calculated based on the precision orifice method described above, in at embodiment.

The features and advantages of the invention may be better understood with reference to the figures and discussions that follow.

FIG. 1 shows, in an embodiment of the invention, a precision orifice method for determining the percentage of error. The precision orifice method assumes that all orifices are the same geometrically.

At a first step 102, the upstream pressure is measured by a pressure sensor (e.g., manometer).

Consider the situation, wherein for example, a gas is being flowed from an MFC into an orifice at an indicated flow rate of 40 sccm. The gas may flow through an orifice and exit the orifice under a choked flow condition. At the choked flow condition, the gas velocity attained is at sonic velocity. In a choked flow condition, the flow rate is independent of downstream pressure through the orifice and is dependent upon the upstream pressure (at the input end of the orifice). Thus, the flow rate at the input end of the orifice may correlate with the upstream pressure. In an example, if upstream pressure is high then flow rate is high. If pressure upstream is low then flow rate is low. In an embodiment, a linear relationship may exist between an upstream pressure and a flow rate. By placing a pressure sensor upstream of the orifice while the orifice is in a choked flow condition, the pressure of the gas may be measured.

At a next step 104, the predicted flow rate may be determined from the upstream pressure. In an embodiment, the pressure versus flow rate is a linear relationship with a slope angle for each gas given an orifice size. The predicted flow rate may be mathematically calculated based on an assumption that flow rate is equal to the measured upstream pressure, multiplied by the slope, plus a constant. In another embodiment, the predicted flow rate associated with the measured upstream pressure may be extracted from an accurate gas table with pressure values and corresponding flow rates for each gas given an orifice size. In an example, the MFC setpoint, or indicated flow rate is 39 sccm and the measured upstream pressure is 151 torr. However, from the accurate gas table, a pressure of 151 torr is associated with a predicted flow rate is 40 sccm. See Gas Table section for a discussion on how the accurate gas table is established.

At a next, step 106, the difference between the predicted flow rate and the indicated flow rate of the MFC may be calculated. In an example, the predicted flow rate is 40 sccm and the indicated flow rate of the MFC; is 39 sccm. Thus, the difference is 1 sccm.

At a final step 108, the percentage of error is calculated. The percentage of error may be calculated by dividing the difference between the predicated flow rate and the indicated flow rate of the MFC (which is 1 sccm, for example) by the indicated flow rate of the MFC in an example, the difference between the predicted and indicated flow rates is 1 sccm. Thus, the percentage of error is $1/40$, which is 0.025 percent. With the percentage of error, the indicated flow rate of the MFC may be adjusted accordingly thus enabling a more accurate flow rate to be entered in a process recipe.

The precision orifice method is a simple, quick, and cost effective method that does not require the reaction chamber to be down for a lengthy period of time like the prior art ROR procedure. For example, (1) the volume of gas that is required to calculate the percentage of error for the precision orifice method is miniscule in comparison to the larger reaction chamber (which can be up to 60 liters) and (2) the precision orifice method does not require time for the reaction chamber to cool down since the measurement is being performed at the orifice and not the reaction chamber.

As mentioned in FIG. 1, the precision orifice method assumes that the diameter and geometry of a given size orifice is the same from one orifice to another. However, realistically, orifices may vary diametrically and geometrically due to manufacturing tolerance, shape, and edge quality. For example, some orifices may have smooth edges while other orifices may have slight sharper edges. In another example, some orifice may be slightly less round, or slightly smaller or larger than the precision orifice. Thus, the orifice that may be employed in the plasma tool may be different, from tool to tool. To account for the differences in the orifice diameter and geometry, tire calibration factor may have to be derived for each orifice.

Figure 2:
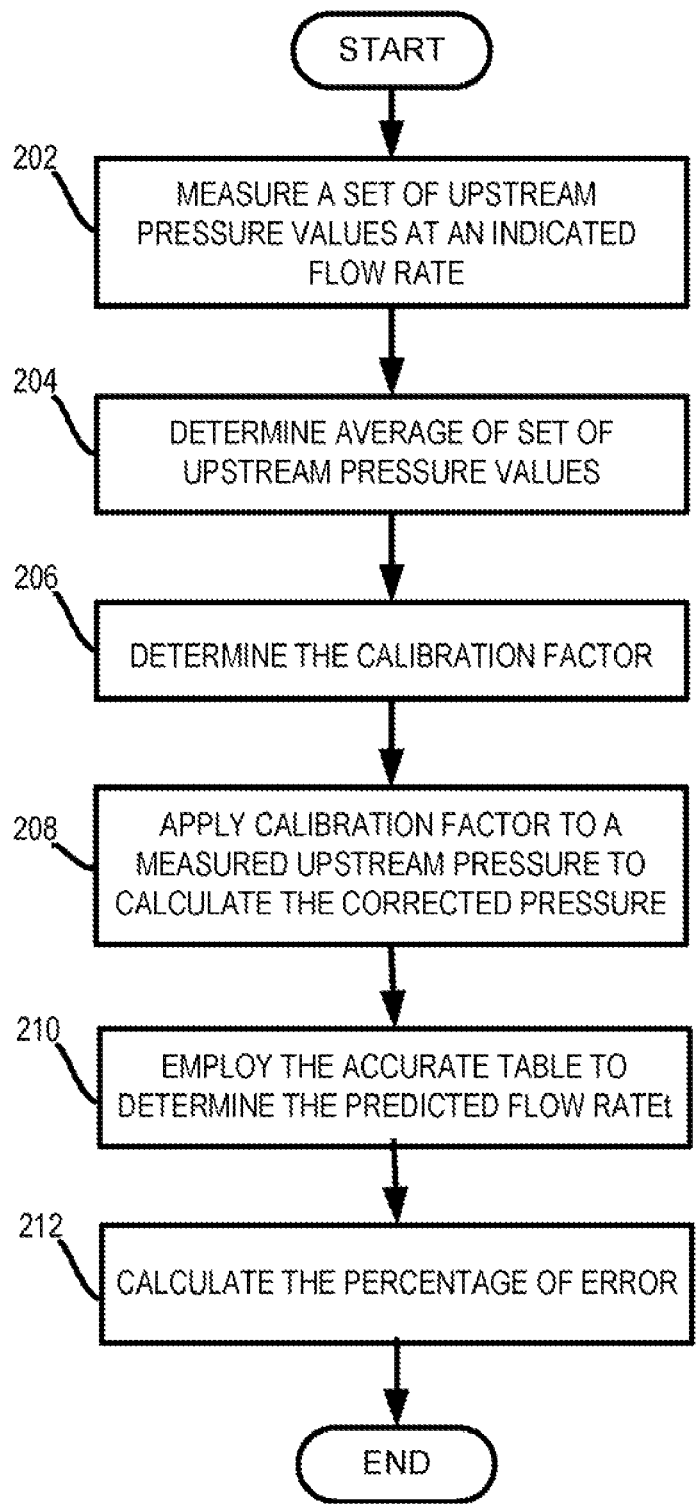
FIG. 2 shows, in an embodiment of the invention, a calibrated orifice method for determining the percentage of error.

FIG. 2 shows, in an embodiment of the invention, a calibrated orifice method for determining the percentage of error between indicated flow rate and the predicted flow rate. The calibrated orifice method include the process of determining a calibration factor, applying the calibration factor to find the corrected predicted flow rate, then calculating percentage or error between the indicated flow rate and the predicted flow rate.

At a first step 202, a set of upstream pressure values may be measured for each orifice at given MFC flow rate in an embodiment, the set of measured upstream pressure values may be collected while the orifice is in a choked flow condition.

Table 1 below shows, in an example, the pressure values of an indicated flow rate (i.e., 40 sccm). As can be seen, the indicated flow rate is the flow rate from which measured upstream pressure values have been collected. The golden pressure values represent the pressure value associated with the indicated flow rate based on the accurate gas table.

TABLE 1 example of pressures vs. flow rate for a given orifice

| Indicated Flow Rate (sccm) | Golden Pressure (torr) | Measured Upstream Pressure (torr) |
| --- | --- | --- |
| 40 | 151.0 | 151.2 |
| 40 | 151.0 | 153.0 |
| 40 | 151.0 | 152.0 |

At a next step 204, the set of measured upstream pressure values may be aggregated and averaged. Once the set of measured upstream pressure values have been collected for a given indicated flow rate, an average may be calculated. Based on the values from Table 1 above, the average of the set of upstream pressure is 152.1 torr. Also, based on Table 1, the average of the set of golden pressure values is 150 torr.

At a next step 206, a calibration factor may be calculated. The calibration factor may be calculated by determining the ratio of the average of the set of measured upstream pressure values to the average of the set of golden pressure values. Generally, the calibration factor is about 1 percent (sometime slightly more or less). In this example, the calibration factor is 0.99. (See Calibration factor section below).

For each gas flow rate of a given orifice, a calibration factor may be calculated. Note that in calculating the calibration factor, the gas that may be employed in calculating the calibration factor may be any gas. One reason is that the calibration factor may be a factor of the geometry of an orifice and not a factor of the gas. However, possible contamination by a gas may be eliminated by employing an inert gas (e.g., $N_2$) instead of a reactive or corrosive gas (e.g., $CH_4$). In an embodiment, the calibration factor may be pre-determined for each orifice before the orifice is installed in the reaction chamber.

At a next step 208, the calibration factor for a given orifice at a given indicated flow rate may be applied to a measured upstream pressure to calculate the corrected pressure. Consider the situation wherein, for example, an MFC verification is being performed to determine the accuracy of the MFC. The measured upstream pressure at an indicated flow rate (e.g., 40 sccm) is collected and multiply by a calibration factor (e.g., 0.99) to determine the corrected pressure. In an example, the measured upstream pressure of 151.2 torr is multiplied by the calibration factor of 0.99 to arrive at a corrected pressure value of 149.7 torr.

At a next step 210, the accurate gas table is employed to determine the predicted flow rate. In an example, the corrected flow rate of 149.7 is associated with a flow rate of 39 sccm on the accurate gas table. Thus, the predicted flow rate should be 39 sccm instead of the indicated flow rate of 40 sccm.

At a final step 212, the percentage of error may be calculated. With the predicted flow rate and the indicated flow rate of the MFC, the difference between the two flow rates may be calculated. The percentage of error may be calculated by dividing the differences between the indicated flow rate of the MFC and the predicted flow rate by the indicated flow rate of the MFC.

Similar to the precision orifice method, the calibrated orifice method is also a simple, quick, and non-expensive method that does not require the plasma tool to be down for a lengthy period of time like the prior art ROR procedure. In addition, the calibrated orifice method takes into account the geometry of the orifice thus providing, a more realistic percentage of error for determining the accuracy of the indicated flow rate of the MFC. Further, the calibrated orifice method may be further simplified since the calibration factor does not have to be recalculated each time the flow rate from the MFC is verified, in an embodiment the calibration factor may be pre-calculated and be integrated into the plasma tool before the plasma tool is shipped out to a customer.

As can be appreciated from embodiments of the invention, methods for validating an actual flow rate of a gas being delivered by a gas delivery system having an MFC into a processing chamber may be performed by measuring upstream pressure within an orifice in a choked flow condition. Both the precision orifice method aid the calibrated orifice methods are quicker methods for validating the actual flow rate of the gas since both methods concentrate on measuring the pressure at the orifice instead of measuring the pressure inside the larger processing chamber. Also, the length of time required to implement, either orifice methods is further shorten because neither orifice methods require the plasma tool to be cooled down prior to implementing either methods. Further, the orifice methods provide a more accurate percentage of errors with less unknown factors. In addition, the actual gas (e.g., inert gas, reactive gas, etc.) that is required in a recipe is employed in the orifice method instead of basing the percentage of error only on inert gases. Moreover, the orifice methods may be incorporated into the plasma tool thus providing a more integrated solution. As a result, the orifice methods provide more effective and efficient methods for validating actual flow rate without significantly adding to the cost of ownership.

Calibration Factor:

As aforementioned, the calibration factor is determined by calculating the ratio of the average of the set of measured upstream pressure values to the average of the set of golden pressure values, as seen by Equation 1. In an embodiment, the calibration factor is calculated for each orifice at a given flow rate.

$$\text{Calibration factor} = \frac{\text{Golden pressure measurement}}{\text{Average upstream pressure measurement}} = \frac{\Delta P_0}{P_m} \quad \text{Equation 1}$$

In other words, a pressure sensor, positioned upstream from the orifice may collect a plurality of upstream pressure measurements as the gas is flowing through the orifice. In an embodiment, the measurement may occur while the orifice is in a choked flow condition. In an example, the flow of gas is being set at an indicated flow rate of 40 sccm. While the orifice is in a choked flow condition, three upstream measurements (e.g., 151.8 torr, 152.5 torr, and 153 torr) are collected. The set of measured upstream measurements is averaged to produce an average upstream measurement of 152.43 torr.

To determine the calibration factor, the average upstream pressure of 152.43 torr is divided by the golden upstream pressure. As aforementioned, the golden upstream pressure is calculated using a precision orifice (one with a known diameter and no blemish). In this example, the golden upstream pressure for the orifice at the indicated flow rate of 40 sccm is 150 torr. By taking the ratio of average upstream pressure of 152.43 and golden upstream pressure, the calibration factor may be calculated. In this example, the calibration factor is 0.984.

With the calibrated factor the upstream pressure may be adjusted based on the calibrated factor as shown in Equation 2 below to determine the calibrated predicted flow rate of an orifice.

$$\text{Orifice (gas)} = mP_{gas}\left(1 \pm \frac{\Delta P_o}{P_m}\right) - \lambda \quad \text{Equation 2}$$

In an embodiment, the upstream pressure measurement for a gas ($P_g$) may be a single data point or may be an average of a set of data points. Since a linear relationship, or slope of the line, may exist between an upstream pressure and a flow rate, the predicted flow rate (i.e., actual flow rate) may be mathematically calculated based on an assumption that flow rate is equal to the upstream pressure multiplied by the slope of the line (m), and a constant ($\lambda$).

$$\frac{\text{Calibrated Predicted Flow Rate} - \text{MFC Flow}}{\text{MFC Flow}} = \left[\frac{mP_{gas}\left(1 \pm \frac{\Delta P_g}{P_m}\right) - \lambda}{\text{MFC Flow}}\right], \quad \text{Equation 3}$$

Once the calibrated predicted flow rate has been determined, the percentage of error between the predicted flow rate and the actual flow rate, as shown in Equation 3 above. As previously mentioned, the percentage of error may be calculated by dividing the difference between the predicated flow rate and the indicated flow rate of the MFC by the calibrated flow-rate of the MFC. In other words, once the calibrated predicated flow rate has been determined, the calibrated predicted flow rate may be divided by the indicated flow rate (i.e., MFC Flow). The percentage of error is then calculated by taking the absolute value of the ratio subtracted by one. As aforementioned, with the percentage of error, the indicated flow rate of the MFC may be adjusted accordingly thus enabling a more accurate flow rate to be entered in a process recipe.

Figure 3:
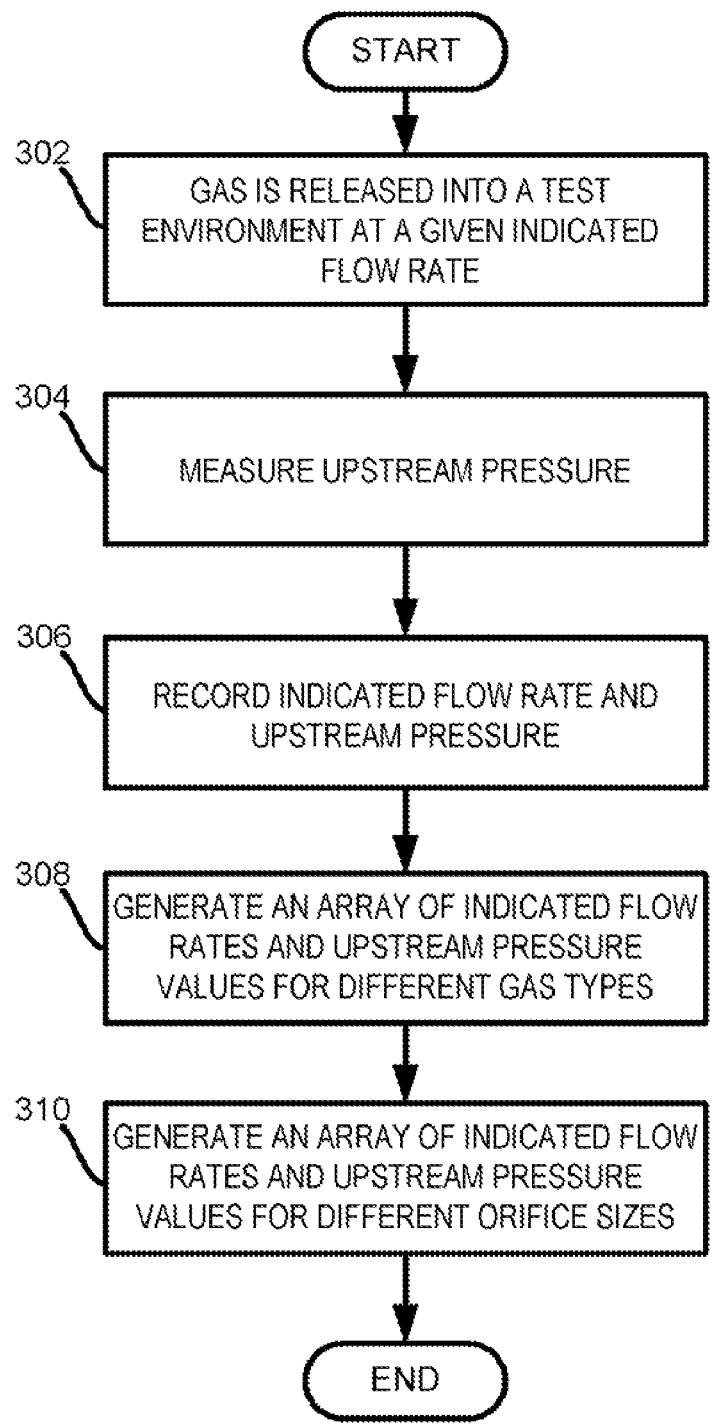
FIG. 3 shows, in an embodiment, a simple flow chart illustrating the steps for generating a set of accurate gas tables based on the experimental based method.

Gas Table:

In an embodiment, the data for the accurate gas table may be calculated by an experimental based method. FIG. 3 shows, in an embodiment, a simple flow chart illustrating the steps for generating a set of accurate gas tables based on the experimental based method.

At a first step 302, gas is released into a test environment, such as an AFV (absolute flow verification) module by turning an MFC to an indicated flow rate. In an example, the gas which is flowing from the MFC into an orifice of a specific size may be flowing at a rate of 1 sccm.

At a next step 304, an upstream pressure value is collected by employing a pressure sensor, such as a manometer. In an example, the upstream pressure for an indicated flow rate of 1 sccm is 6.63 torr.

At a next step 306, the indicated flow rate and the upstream pressure value is recorded to a table.

At a next step 308, an array of indicated flow rates to a set of upstream pressure values is generated by changing the indicated flow rate, in an example, the MFC is changed to allow a flow rate of 2 sccm. By measuring the upstream pressure at different indicated flow rates, an accurate gas table is generated with corresponding pressure buildup. See Table 2 below for an example of an accurate gas table for an $O_2$ gas for a 0.007 inch orifice.

TABLE 2

Example of an Accurate Gas Table for an $O_2$ (gas) for a 0.007" orifice

| Pressure(torr) | Flow (sccm) |
| --- | --- |
| 6.63 | 1 |
| 11.46 | 2 |
| 15.87 | 3 |
| 20.09 | 4 |
| 24.20 | 5 |
| 28.21 | 6 |
| 32.06 | 7 |
| 35.98 | 8 |
| 39.79 | 9 |
| 43.86 | 10 |
| 62.74 | 15 |
| 81.07 | 20 |
| 98.98 | 25 |
| 116.58 | 30 |
| 134.00 | 35 |
| 151.25 | 40 |
| 184.83 | 50 |
| 350.00 | 96.3 |

At a next step 310, steps 302-308 are repeated .for different gas types, thereby creating an accurate gas table for different gas types. In an example, an accurate gas table may be created for inert gases, corrosive gases, and the like.

At a next step 312, steps 302-310 are repealed for different orifice sizes. For example, the orifice size may range between 0.007 inches to about 0.05 inches. Accordingly, the size of the orifice may vary depending upon the tool requirement. As can be appreciated from the foregoing, the set of accurate gas tables may be expanded to include additional orifice sizes as the tool requirement changes.

The experimental based method allows for an accurate gas table of an array of pressure/flow rate to be generated for each gas type and each orifice size. With the set of accurate gas tables, flow rate may be calculated when an unknown amount of gas is flowing through an orifice. In an example, the flow rate may be determined, by comparing an upstream pressure value of 116.58 torr measured for $O_2$ flowing through a 0.007 inches orifice against an accurate gas table. In tins example, the flow rate is 30 sccm. In an embodiment, the flow rate may be extrapolated by employing linear interpolation between the two closest flow rates. In an example, if the upstream pressure value is 50.35 torr, the flow rate is determined to be closer to 10 sccm than 15 sccm.

As can be appreciated from the foregoing, the experimental based method assumes a golden test environment. However, the test environment for producing the set of accurate gas tables may not always be golden since components of the test environment may deviate slightly from the golden conditions. In an example, an indicated flow rate from an MFC is set to 1 sccm. However, the MFC may be slightly offset and the indicated flow rate may actually be 1.005 sccm. In another example, the orifice size is assumed to be of 0.007 inches; however, the actual size of the orifice may actually be 0.0075 inches.

In an embodiment, a computational model based method is provided for generating a set of accurate gas tables in a golden test environment. By employing a Computational Fluid Dynamics (CFD) model, a golden test environment is created with established boundary conditions. The CFD model is a computer simulated model that may create a golden test environment by defining the value for each component. In an example, the indicated flow rate may be defined as 1 sccm. In another example, the orifice size may be defined as 0.007 inches. Since the CFD model is a simulated environment, the test environment is not subjected to error due to inaccuracies in the components.

Figure 4:
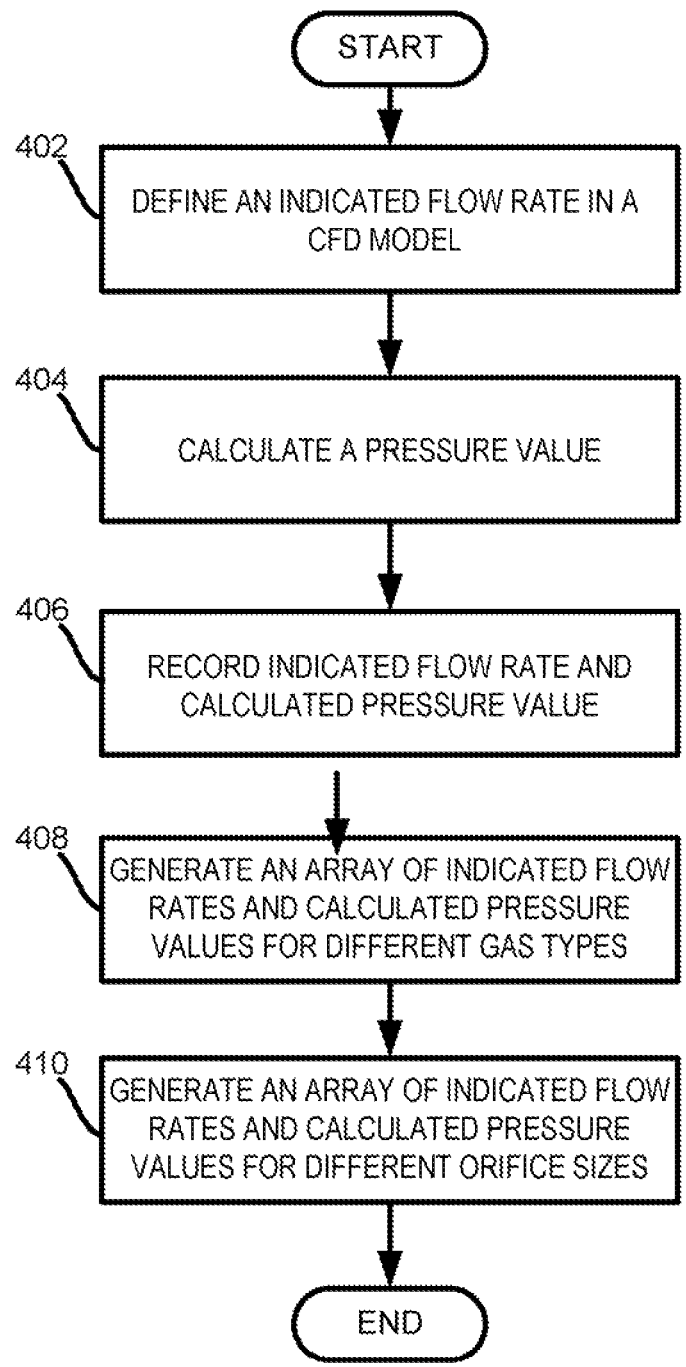
FIG. 4 shows, in an embodiment, a simple flow chart illustrating the steps for generating a set of accurate gas table based on the computational model based.

FIG. 4 shows, in an embodiment, a simple flow chart illustrating the steps for generating a set of accurate gas table based on the computational model based.

At a first step 402, an indicated flow rate is defined in a CFD model. In an example, the indicated flow rate may be set to 1 sccm.

At a next step 404, a pressure value is calculated. In an embodiment, the pressure value for an indicated flow rate may be calculated by applying a mathematical equation, such as Navier-Stokes equation. The Navier-Stokes equation is a mathematical equation that is well-known in the art and is usually applied to describe Newton's second law of motion for gases and liquids.

At a next step 406, the indicated flow rate and the calculated pressure value is recorded on a table.

At a next step 408, an array of indicated flow rates to a set of calculated pressure values may be generated by changing the indicated flow rate. In an example, the indicated flow rate of the CFD model is changed to 2 sccm.

At a next step 410, steps 402-408 are repeated for different gas types, thereby creating an accurate gas table for different gas types. In an example, an accurate gas table may be created for $O_2$, $N_2$, $He_2$, and the like.

At a next step 412, steps 302-310 are repeated for different orifice sizes.

The computational model based method allows for an accurate gas table of an array of pressure/flow rate to be generated for each gas type and each orifice size. With the computational model based method, the set of accurate gas tables provide a reliable set of values that may be applied in determining predicted flow rate in the precision orifice method and the calibration factor in the calibrate orifice method.

As can be appreciated from the foregoing, with a set of accurate gas tables, predicted flow rate may be determined in a production environment enabling a comparison between the predicted flow rate and the indicated flow rate of an MFC. With the percentage of error calculated from the comparison between the predicated and the indicated flow rates, the MFC may be fine-tuned, thereby removing recipe processing error due to gas flow rate.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member, ft should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for determining an actual gas flow rate in a reaction chamber of a plasma processing system, the method comprising:
    delivering gas by a gas flow delivery system controlled by a mass flow controller (MFC) to an orifice, said orifice being upstream from said reaction chamber;
    pressurizing said gas to create a choked flow condition within said orifice;
    measuring a set of upstream pressure values of said gas via a set of pressure sensors; and
    applying, using a programmed computing device, a calibration factor of a set of calibration factors to determine said actual flow rate, said calibration factor being a ratio of an average of said set of upstream pressure values to an average of a set of golden upstream pressure values, said golden upstream pressure values representing pressure values associated with an indicated flow rate, said indicated flow rate being a flow rate as indicated by said MFC.

2. The method of claim 1 wherein each calibration factor of said set of calibration factors is associated with a respective specific orifice of a set of orifices, said each calibration factor being dependent upon at least one of diameter and geometry of said respective specific orifice.

3. The method of claim 1 wherein said calibration factor is applied to said set of upstream pressure values to determine a corrected pressure value.

4. The method of claim 3 wherein said actual flow rate is determined by comparing said corrected pressure value to an accurate gas table, said accurate gas table representing a table of pressure values and flow rate values based on real gas properties and an accurate MFC and a precision orifice.

5. The method of claim 4 wherein said table of said pressure values being a table of said golden pressure values.

6. The method of claim 5 wherein said percentage of error is applied to adjust said MFC.

7. The method of claim 6 wherein said set of pressure sensors is positioned upstream from said orifice.

8. The method of claim 4 further including calculating a percentage of error for said MFC by dividing said indicated flow rate into a difference between said actual flow rate and said indicated flow rate.

9. The method of claim 1 wherein said set of pressure sensors is a set of manometers.

10. A method for validating an actual gas flow rate in a reaction chamber of a plasma processing system, the method comprising:
    delivering gas by a gas flow delivery system controlled by a mass flow controller (MFC) to an orifice, said orifice being upstream from said reaction chamber;
    pressurizing said gas to create a choked flow condition within said orifice;
    measuring upstream pressure of said gas via a set of pressure sensors to collect a set of upstream pressure values;
    calculating, using a programmed computing, device, said actual flow rate based on said set of upstream pressure values of said orifice, wherein said actual flow rate is extracted by applying said set of upstream pressure values to an accurate gas table, said accurate gas table representing a table of pressure values and flow rate values based on real gas properties and an accurate MFC and a precision orifice; and
    comparing said actual flow rate to an indicated flow rate, said indicated flow rate being a flow rate as indicated by said MFC.

11. The method of claim 10 wherein said orifice is a precision orifice.

12. The method of claim 11 wherein said orifice has an area size smaller than said reaction chamber.

13. The method of claim 10 wherein said set of pressure sensors is positioned upstream from said orifice.

14. The method of claim 13 wherein said set of pressure sensors is a set of manometers.

15. The method of claim 10 wherein said set of upstream pressure values has a linear relationship with said actual flow rate.

16. The method of claim 10 further including calculating a percentage of error for said MFC by dividing an indicated flow rate into a difference between said actual flow rate and said indicated flow rate.

17. The method of claim 16 wherein said percentage of error is applied to adjust said MFC.

18. The method of claim 10 further including applying a calibration factor or a set of calibration factors to determine said actual flow rate, said calibration factor being a ratio of an average of said set of upstream pressure values to an average of a set of golden upstream pressure values, said golden upstream pressure values representing pressure values associated with an indicated flow rate, said indicated flow rate being a flow rate as indicated by said MFC.

19. The method of claim 18 further including calculating a percentage of error for said MFC by dividing said indicated flow rate into a difference between said actual flow rate and said indicated flow rate.

* * * * *